000
United States Patent Office 3,256,193
Patented June 14, 1966

3,256,193
POLYHYDROXYOXAALKYL ESTERS
James M. Petersen, Fishkill, and David D. Reed, Glenham, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,658
8 Claims. (Cl. 252—46.6)

This invention relates to novel reaction products of a glycidol compound and hydroxyalkyl hydrocarbonthiophosphonate and lubricant compositions thereof.

More particularly, the invention pertains to polyhydroxyoxaalkyl hydrocarbonthiophosphonates of the formula:

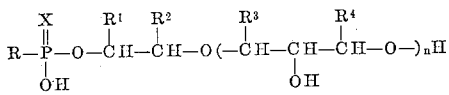

where R is a monovalent hydrocarbon derived radical (hydrocarbyl), $R^1$, $R^2$, $R^3$ and $R^4$ are radicals selected from the group consisting of hydrogen and alkyl from 1 to 6 carbons, X is a chalcogen selected from the group consisting of sulfur and a mixture of oxygen and sulfur and $n$ is a value from 1 to 5, inclusively.

The polyhydroxyoxaalkyl hydrocarbonthiophosphonates of the invention are useful as detergent and dispersant additives in lubricants and fuels such as mineral oil, synthetic ester oil, and jet fuel.

Broadly, the polyhydroxyoxaalkyl hydrocarbonthiophosphonates of the invention are formed by reacting a hydroxyalkyl hydrocarbonthiophosphonate with a glycidol compound at an elevated temperature. Catalyst is required when compounds where $n$ is greater than 1 are desired.

*Preparation of the hydroxyalkyl hydrocarbonthiophosphonate reactant*

The hydroxyalkyl hydrocarbonthiophosphonate is described in co-assigned, copending application Serial No. 59,505, filed September 30, 1960. Further, its manufacture is additionally described in co-assigned, copending application Serial No. 63,973, filed October 21, 1960. The hydroxyalkyl hydrocarbonthiophosphonates are prepared by first forming a complex hydrocarbon-$P_2S_5$ reaction product. As is well known, the hydrocarbon-$P_2S_5$ reaction product is prepared by the reaction of hydrocarbons with $P_2S_5$ at elevated temperature. Broadly, suitable hydrocarbons are aromatic hydrocarbons, cycloaliphatic and aliphatic hydrocarbons. Although a wide variety of hydrocarbons are usable as the reaction product, aliphatic monoolefins are generally employed as the hydrocarbon reactant. Cracked lubricating fractions constitute another preferred class of materials for reaction with $P_2S_5$ to form the hydrocarbon-$P_2S_5$ product.

The olefinic hydrocarbons which react with $P_2S_5$ usually contain at least 12 carbon atoms although a lower molecular weight olefin can be employed. Olefin polymers such as polyisobutylene, polybutylene, polypropylene and copolymers of olefins such as propylene-isobutylene copolymer are particularly preferred materials for the reaction with $P_2S_5$. In general, olefin polymers and copolymers having an average molecular weight of between about 250 and 50,000 are employed to form the $P_2S_5$-hydrocarbon product with polymers and copolymers having an average molecular weight in the range from about 600 to 5,000 being preferred. A particularly preferred olefin polymer is the monoolefin, polybutylene having an average molecular weight between about 600 and 50,000. Copolymers of conjugated dienes and olefins such as the copolymer of butadiene and isobutylene of an average molecular weight in the above described range also are desirable reactants with $P_2S_5$.

The hydrocarbon-$P_2S_5$ reaction product is prepared by contacting $P_2S_5$ with the hydrocarbon at a temperature from about 100 to 320° C. in a non-oxidizing atmosphere, for example, under a blanket of nitrogen. In the reaction mixture, the $P_2S_5$ constitutes about 5 to 40% thereof. The resultant product is then hydrolyzed at a temperature between about 100 and 260° C. by contacting with steam. The steam treatment converts the hydrocarbon-$P_2S_5$ product to a hydrocarbonthiophosphonic acid and inorganic phosphorus acid. The thiophosphonic acid has the general formula:

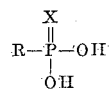

wherein R is hydrocarbyl derived from the charged hydrocarbon used in the manufacture of the hydrocarbon-$P_2S_5$ reactant. R is preferably polyolefin derived radical containing 20 to 200 carbon atoms, X is a sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The thus formed thiophosphonic acid is reacted with an alkylene oxide of the formula:

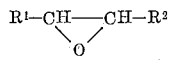

at a temperature between about 60 to 150° C., under a pressure between atmospheric and 500 p.s.i.g. to form the hydroxyalkyl hydrocarbonthiophosphonate reactant of the formula:

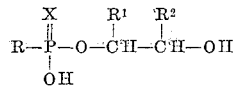

where R, $R^1$, $R^2$ and X are as heretofore defined. Examples of the hydroxyalkyl hydrocarbonthiophosphonate reactants contemplated herein are 2-hydroxyethyl polybutene(940 M.W.)thiophosphonate, 2-hydroxyethyl polybutene(2000 M.W.)thiophosphonate, 1,2-diethyl-2-hydroxyethyl polypropylene(1500 M.W.)thiophosphonate, and 1-methyl-2-propyl-2-hydroxyethyl polyisopentylene (2500 M.W.)thiophosphonate.

*The glycidol compound reactant*

The hydroxyepoxyalkane reactant contemplated herein is of the formula:

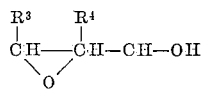

wherein $R^3$ and $R^4$ are hydrogen or alkyl of from 1 to 6 carbons. Specific examples of the hydroxyepoxyalkanes contemplated herein are 1-methyl-1-hydroxy-2,3-epoxybutane; 3-ethyl-3-hydroxy-1,2-epoxypropane; and 3-hydroxy-1,2-epoxypropane.

*Catalyst*

If the addition of two or more moles of hydroxyepoxyalkane per mole of hydrocarbon thiophosphonate is desired then the presence of an acid or base catalyst is required. Examples of the classes of catalysts contemplated herein are the Lewis acids, organic acids, mineral acids, alkali metals, and alkali metal alcoholates. Specific examples are $BF \cdot C_2H_5OC_2H_5$, $BF_3$, $CCl_3CO_2H$, $CF_3COOH$, Na, K, HF, $C_2H_5OK$, $AlCl_3$, $SnCl_4$, $H_2SO_4$ and $H_3PO_4$.

Preparation of the polyhydroxyoxaalkyl hydrocarbonthiophosphonates

The polyhydroxyoxalkyl hydrocarbonthiophosphonates of the invention are generally prepared by contacting the hydroxyepoxyalkane reactant with the hydroxyalkyl hydrocarbonthiophosphonate at a temperature between about 25 and 150° C., in a mole ratio of epoxyalkane to thiophosphonate reactant of between about 0.1:1 and 5:1. When the addition of two or more molecules of epoxyalkane per molecule of thiophosphonate reactant is desired, catalyst is utilized in a mole ratio of thiophosphonate reactant to catalyst of between about 1:0.001 and 1:0.1. Further, the mole ration of epoxyalkane to thiophosphonate reactant in the reaction should be greater than one, the addition being essentially quantitative on a mole basis.

The reaction is normally conducted for a period of between about 1 and 4 hours. At the end of the reaction period the polyhydroxyalkyl hydrocarbonthiophosphonate product can be purified by standard means. One means of removing impurities is employing fractional distillation under reduced pressure and elevated temperature utilizing an inert gas such as nitrogen to act as a stripping agent.

Specific examples of the polyhydroxyoxaalkyl hydrocarbonthiophosphonates contemplated herein are 5,6-dihydroxy-3-oxahexyl polybutene(940 M.W.)thiophosphonate; 5,9,10-trihydroxy-3,7-dioxadecyl polybutene(940 M.W.)thiophosphonate; 5,9,10-trihydroxy-3,7-dioxadecyl polypropylene(1500 M.W.)thiophosphonate; and 4,6,8,10-tetramethyl-5,9,10-trihydroxy-3,7-dioxadecyl polyisobutylene(2500 M.W.)thiophosphonate.

Lubricant compositions containing the novel polyhydroxyoxaalkyl hydrocarbonthiophosphonates As heretofore stated the thiophosphonates of the invention impart detergent-dispersant properties to lubricating oils. Hydrocarbon mineral oils are usable in the thiophosphonate lubricant composition of the invention. They can be paraffin-base, naphthene base, or mixed paraffin-naphthane base distillate or residual oils. Paraffin base distillate lubricating oil fractions are used in the formulation of premium grade oil such as are contemplated in the invention. The lubricating bases generally have been subjected to solvent refining to improve their lubricity and viscosity-temperature relationship as well as solvent dewaxing to remove waxy components to improve the pour of the oil. Broadly speaking, mineral lubricating oils having an S.U.S. viscosity at 100° F. between 50 and 1000 may be used in the formulation of the improved lubricants of this invention, but usually the S.U.S. viscosity range falls between 70 and 300 at 100° F.

The mineral lubricating oils containing the polyhydroxyoxaalkyl esters of the hydrocarbonthiophosphonic acids may also contain other additives designed to impart other desirable properties thereto. For example, V.I. improvers such as polymethacrylate are normally included therein as are corrosion inhibitors and other detergents.

A widely used V.I. improver is polymethacrylate of the general formula:

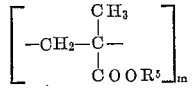

wherein $R^5$ is an aliphatic radical of from 1 to 20 carbons and $m$ is an integer between 600 and 35,000.

Another used supplementary detergent is an alkaline earth metal alkylphenolate. Barium nonoylphenolate, barium dodecylcresolate, and calcium dodecylphenolate are examples of such detergents. These products which are well known detergent additives are usually present in the lubricating oil in the concentration between 0.1 and 5 wt. percent.

Still another additive employed is anti-oxidant divalent metal dialkyl dithiophosphates resulting from the neutralizing of a $P_2S_5$-alacahol reaction product with a divalent metal or divalent metal oxide. Barium and zinc dialkyl dithiophosphates are the most widely used oxidation and corrosion inhibitors. Metal dialkyl dithiophosphates are usually present in the lubricant concentration between 0.1 and 3 wt. percent.

Synthetic lubricating bases of the ester or ether type may also be used as the lubricating base oil. High molecular weight, high boiling aliphatic dicarboxylic acid esters possess excellent viscosity-temperature relationships and lubricating properties and are finding ever-increasing utilization in lubricating oils adapted for high and low temperature lubrication. Esters of these type are used in the formulation of jet engine oils.

The polyhydroxyoxaalkyl-hydrocarbonthiophosphonates of the invention are present in lubricating oils in concentrations sufficient to impart dispersant and detergent properties thereto. In concentrates used in the formulation of the finished lubricants the concentration of the polyhydroxyoxaalkyl hydrocarbonthiophosphonate can be as high as 50%. In finished lubricants the concentration of the additive falls between 0.2 and 10 wt. percent with a concentration between 1 and 5 wt. percent normally preferred.

The following examples further illustrate the invention but are not to be construed as limitations thereof. Example I illustrates the preparation of the hydroxyalkyl hydrocarbonthiophosphonate reactant. Example II to IV illustrate the preparation of the polyhydroxyoxaalkyl hydrocarbonthiophosphonates. Example V demonstrates the lubricant compositions of the invention and the detergent-dispersant properties of the polyhydroxyoxaalkyl hydrocarbonthiophosphonates.

EXAMPLE I

A polybutenethiophosphonic acid of the formula:

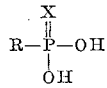

wherein R is a polybutene radical of an average molecular weight of 940 and X is a mixture of sulfur and oxygen was prepared by contacting polybutene(940 M.W.) with $P_2S_5$ in a mole ratio of polybutene to $P_2S_5$ of 1.1:1 and in the presence of sulfur and amount of 3 wt. percent based on the polybutene. The reaction mixture was maintained at 232° C. until said mixture is soluble in n-pentane. The mixture was then diluted with approximately 150 wt. percent of a naphthene base oil having an S.U.S. viscosity at 100° F. of 100, steamed at 176° C. for 10 hours in a nitrogen atmosphere and then dried by the passage of nitrogen therethrough at 176° C. The steamed product was extracted with 50% by volume methanol at 55° C. to give a methanol extract containing inorganic phosphorus acid and a lubricating oil raffinate containing polybutene thiophosphonic acid of the formula:

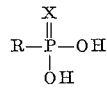

where R is a polybutene derived radical of an average molecular weight of 940. The raffinate after being stripped free of methanol at a temperature of 176° C. at atmospheric pressure had a Neut. No. (neutralization number) of 17.0. Sulfur analysis of the thiophosphonic acid found it to have a sulfur content of 0.63 wt. percent. The theoretical sulfur content for

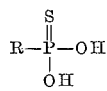

is 0.99 wt. percent indicating that X is a mixture of sulfur and oxygen.

The oil raffinate prepared above in the amount of 7000 grams containing 2.15 moles polybutene(940 M.W.)thiophosphonic acid was charged to a 12 liter 3-neck flask equipped with stirrer, gas inlet tube extending below the surface of the acid reactant, a thermometer immersed in the acid, and a water-cooled reflux condenser. The acid was heated to 121° C. with stirring over a 1 hour period and nitrogen blowing. Ethylene oxide was then passed through a trap in which it was mixed with nitrogen and introduced into the reaction flask at the rate so as to maintain a gentle reflux with ethylene oxide. When ethylene oxide was no longer taken up, as evidenced by the increase in the reflux rate its addition was stopped. The excess ethylene oxide in the reaction mixture was allowed to reflux for 1 hour. At the end of this period, ethylene oxide remaining in the reaction flask was expelled therefrom by passing nitrogen through the reaction mixture for 1.5 hours. The excess ethylene oxide was recovered in a Dry Ice-acetone trap attached to the outlet of the reflux condenser. Upon cooling there was obtained a reaction product which was shown by analysis to consist of an oil solution of 2 - hydroxyethylpolybutene(940 M.W.)thiophosphonate of the formula:

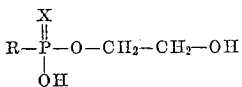

where R is a polybutene radical of an average molecular weight of 940 and X is a mixture of sulfur and oxygen. Analysis of the product gave the following results:

| Description | Calculated | Found |
| --- | --- | --- |
| Neut. No | 0.0 | 0.35 |
| Hydroxyl No | 17 | 18 |
| Phorphorus, wt. percent | 0.94 | 0.84 |
| Sulfur, wt. percent | [1] 0.96 | 0.62 |

[1] Assuming X is 100% sulfur.

EXAMPLE II

One thousand grams of the product solution of Example I containing 0.3 mole of 2-hydroxyethyl polybutene-(940 M.W.)thiophosphonate was charged to a 2 liter, 3-neck flask equipped with a stirrer, thermometer, and gas inlet tube. Stirring was begun and the mixture was heated to 93° C. whereupon 23 grams (0.31 mole) glycidol was added dropwise to the heated, stirred mixture over a 1 hour period. Stirring and heating at 93° C. was continued for a 1 hour period. At the end of the reaction period the reaction mixture was purified by subjecting it to stripping with nitrogen at a temperature of 93° C. under mercury pressure of 1–2 mm. Hg. The stripped product was shown by analysis to consist of an oil solution of 5,6-dihydroxy-3-oxahexyl polybutene(940 M.W.)thiophosphonate of the formula:

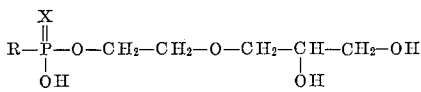

where R is a polybutene derived radical having an average molecular weight of 940 and X is a mixture of sulfur and oxygen. The product analyzed as follows:

| Description | Calculated | Found |
| --- | --- | --- |
| Phosphorus, wt. percent | 0.92 | 0.94 |
| Hydroxyl No | 28 | 23 |
| Neut. No | 0 | 0 |
| Sulfur, wt. percent | [1] 0.05 | 0.50 |

[1] Assuming X is 100% sulfur.

EXAMPLE III

In a one liter flask fitted with a glass stirrer, thermometer, thermocouple, dropping funnel, and condenser was placed 555 grams of naphthene oil (100 SUS at 100° F.) containing 0.1 mole of 2-hydroxyethyl polybutene (2000 M.W.)thiophosphonate of the formula:

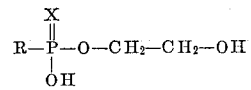

where R is a polybutene radical having an average molecular weight of 2000 and X is a mixture of sulfur and oxygen. The flask was then heated to 93° C. and 15.6 grams (0.2 mole) of 95 wt. percent glycidol were added dropwise. Following the addition the reaction mixture was maintained at 93° C. for two hours. The product was stripped with nitrogen to 94° C. under 1.5 mm. Hg. pressure. The stripped product was shown by analysis to be an oil solution of 5,6-dihydroxy-3-oxahexyl polybutene(2000 M.W.)thiophosphonate of the formula:

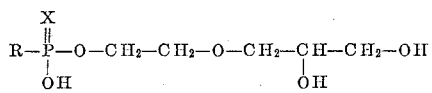

where R and X are as heretofore defined. The product analyzed as follows:

| Description | Calculated | Found |
| --- | --- | --- |
| Phosphorus, wt. percent | 0.55 | 0.55 |
| Hydroxyl No | 20 | 21 |
| Neut. No | 0 | 0.6 |
| Sulfur, wt. percent | [1] 0.6 | 0.34 |

[1] Assuming X is 100% sulfur.

EXAMPLE IV

In a 1 liter flask fitted with a glass stirrer, thermometer, thermocouple and dropping funnel was placed 284 grams of a naphthene oil (100 SUS at 100° F.) solution containing 0.1 mole of 2-hydroxyethyl polybutene(940 M.W.)thiophosphonate of Example 1 and heated to 75° C. To the flask there was then added 2 grams (0.014 mole of boron trifluoride etherate followed by the dropwise addition of 20 grams (0.255 mole) of 95 wt. percent glycidol. After the addition was completed the reaction mixture was maintained at 75° C. for two hours. The product was stripped to 75° C. at 1.5 mm. Hg. pressure. The product was found to be an oil solution of 5,9,10-trihydroxy-3,7-dioxadecyl polybutene(940 M.W.) thiophosphonate of the formula:

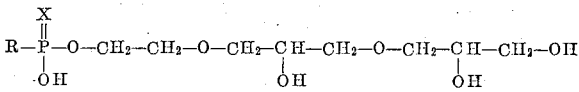

where R is a polybutene radical of an average molecular weight of 940 and X is a mixture of sulfur and oxygen. The product analyzed as follows:

| Description | Calculated | Found |
| --- | --- | --- |
| Phosphorus, wt. percent | 1.07 | 0.99 |
| Hydroxyl No | 58.4 | 57 |
| Neut. No | 0 | 1.59 |
| Sulfur, wt. percent | [1] 1.10 | 0.46 |

[1] Assuming X is 100% sulfur.

EXAMPLE V

This example illustrates the lubricant composition of the invention and the outstanding detergent-dispersant properties of the thiophosphonates of the invention utilizing the well known CLR Engine Sludge Test.

A description of an SAE 10W-30 motor oil containing 5,6 - dihydroxy - 3 - oxahexyl polybutene(940 M.W.)thiophosphonate of Example II (Composition A) and the CLR test results are reported below. For comparison a blank was also tested. The blank was essentially identical to Composition A except it did not contain the thiophosphonate additive:

Composition A

| Description: | Concentration, Wt. Percent |
|---|---|
| Refined Paraffinic Distillate Oil (SUS Visc. at 100° F.=100) | 89.45 |
| 5,6 - dihydroxy - 3 - oxahexyl polybutene- (940 M.W.)thiophosphonate | 3.27 |
| Barium $C_{12}$ alkylphenolate | 1.83 |
| Zinc isopropyl 1,3 - dimethylbutyl dithiophosphate | 0.88 |
| ($CO_2$ neutralized) Basic Barium Sulfonate | 0.57 |
| Mineral oil concentrate containing 25 wt. percent of a copolymer of mixed methacrylate alkyl esters in which the alkyl groups range from butyl to octadecyl | 4.00 |
| Dimethylsilicone anti-foam concentrate, p.p.m. | 150 |

CLR SLUDGE TEST

| Hours | 38 | 54 | 70 | 94 | 110 |
|---|---|---|---|---|---|
| Sludge Rating Composition A | | 9.6 | 9.6 | 8.0 | 6.1 |
| Sludge Rating, Blank | 6.9 | 5.4 | | | |

10 = Clean oil.

As can be seen from above the oil containing the thiophosphonate of the invention took about 110 hours to accumulate the amount of sludge the Blank accumulated in 38 hours.

We claim:

1. A product selected from the group of polyhydroxyoxaalkyl hydrocarbonthiophosphonate and a mixture of said hydrocarbonthiophosphonate and corresponding hydrocarbonphosphonate, said hydrocarbonthiophosphonate of the formula:

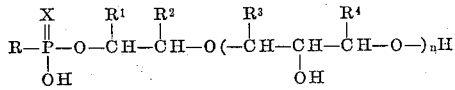

where R is hydrocarbyl derived from a polyolefin having an average molecular weight between about 250 and 50,000, $R^1$, $R^2$, $R^3$ and $R^4$ are radicals selected from the group consisting of hydrogen and alkyl of from 1 to 6 carbons, X is sulfur, and $n$ is a value from 1 to 5 inclusively, said mixture consisting of a major amount of said hydrocarbonthiophosphonate and a minor amount of said corresponding hydrocarbonphosphonate where X is oxygen.

2. A product in accordance with claim 1 wherein said product is said mixture.

3. A product in accordance with claim 1 wherein said product is said mixture, R is a polybutene derived radical having an average molecular weight of about 940, $R^1$, $R^2$, $R^3$ and $R^4$ are hydrogen, and $n$ is 1.

4. A product in accordance with claim 1 wherein said product is said mixture, R is a polybutene derived radical having an average molecular weight of about 940, $R^1$, $R^2$, $R^3$ and $R^4$ are hydrogen and $n$ is 2.

5. A lubricating oil composition comprising a major amount of lubricating oil and an effective detergent-dispersant amount of a component selected from the group consisting of polyhydroxyoxaalkyl hydrocarbonthiophosphonate and a mixture of said hydrocarbonthiophosphonate and corresponding hydrocarbonphosphonate, said hydrocarbonthiophosphonate of the formula:

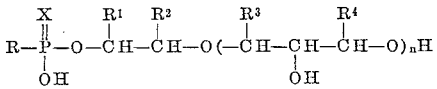

where R is a monovalent hydrocarbon derived from a polyolefin having an average molecular weight between about 250 and 50,000, $R^1$, $R^2$, $R^3$ and $R^4$ are radicals selected from the group consisting of hydrogen and alkyl from 1 to 6 carbons, X is sulfur and $n$ is a value of 1 to 5 inclusively, said lubricating oil selected from the group consisting of mineral lubricating oil, synthetic ester lubricating oil and synthetic ether lubricating oil, said mixture consisting of a major amount of said hydrocarbonthiophosphonate and a minor amount of said corresponding hydrocarbonphosphonate where X is oxygen.

6. A lubricating oil composition in accordance with claim 5 wherein said component is said mixture.

7. A lubricating oil composition in accordance with claim 5 wherein said component is said mixture, said lubricating oil is a mineral lubricating oil having an SUS viscosity at 100° F. between 50 and 1000 and said component being present in a concentration between 0.2 and 10 wt. percent.

8. A lubricating oil composition in accordance with claim 5 wherein R is a polybutene derived radical having an average molecular weight of about 940, $R^1$, $R^2$, $R^3$ and $R^4$ are hydrogen, said component is said mixture, $n$ is 1, said lubricating oil is mineral lubricating oil having an SUS viscosity at 100° F. between 50 and 1000 and said component being present in a concentration between 0.2 and 10 wt. percent.

References Cited by the Examiner

UNITED STATES PATENTS 2,914,478  11/1959  Neff _____ 252—46.6

FOREIGN PATENTS 792,553  3/1958  Great Britain.
838,928  6/1960  Great Britain.

DANIEL E. WYMAN, *Primary Examiner.*

LOUIS G. XIARHOS, *Examiner.*